United States Patent [19]
Morgan

[11] Patent Number: 6,095,462
[45] Date of Patent: Aug. 1, 2000

[54] AIR HOSE HOLDER

[76] Inventor: Gary L. Morgan, 159 Kozey Rd., Eastford, Conn. 06242

[21] Appl. No.: 09/110,347

[22] Filed: Jul. 6, 1998

[51] Int. Cl.⁷ ..................................................... A47G 29/00
[52] U.S. Cl. ........................... 248/82; 248/80; 248/316.4; 248/74.1
[58] Field of Search .............................. 248/27.1, 51, 56, 248/61, 65, 74.1, 75, 300, 316.4, 80, 81, 82

[56] References Cited

U.S. PATENT DOCUMENTS

| | | | |
|---|---|---|---|
| 240,736 | 4/1881 | Leeds | 248/300 X |
| 619,517 | 2/1899 | Trammel | 248/81 |
| 2,294,483 | 9/1942 | Smith | 248/74.1 X |
| 2,440,745 | 5/1948 | Hauck | 248/81 |
| 2,750,143 | 6/1956 | Sjoboen | 248/316.4 X |
| 4,615,500 | 10/1986 | Layson | 248/65 |
| 4,714,219 | 12/1987 | Mayse | 248/65 |
| 4,998,692 | 3/1991 | Shigeki et al. | 248/75 X |
| 5,423,499 | 6/1995 | Webb | 248/27.1 |
| 5,687,937 | 11/1997 | Habib | 248/51 |
| 5,730,522 | 3/1998 | Wyke et al. | 248/300 X |

Primary Examiner—Leslie A. Braun
Assistant Examiner—Gwendolyn Baxter
Attorney, Agent, or Firm—Deborah A Basile

[57] ABSTRACT

Disclosed is an air hose holding device, particularly useful to people using air hoses while working on roof tops. During use, the base of the device is fixed to a mounting surface, such as a roof, with as few as two nails. The hose is then passed through an aperture in the device. An adjustable slip latch mounted above the aperture has a half-circle cut into it. By moving and fixing the adjustable slip latch closer to or farther away from the aperture, the adjustable slip latch covers more or less of the aperture, and the half-circle completes the circular shape of the aperture to make the aperture smaller or larger. Thus, different size hoses may be held in place with the single device. The device need only be mounted once for an entire job, since the hose may be pulled through and held at different lengths within the aperture of the device, by simply adjusting the slip latch. Upon completion of the work, the nails fixing the device to the mounting surface easily slip through quick release nail holes, and the two nails may then be driven into the surface or removed. Also disclosed is a kit containing the air hose holder, an air gun and an air hose which would be sold together.

17 Claims, 2 Drawing Sheets

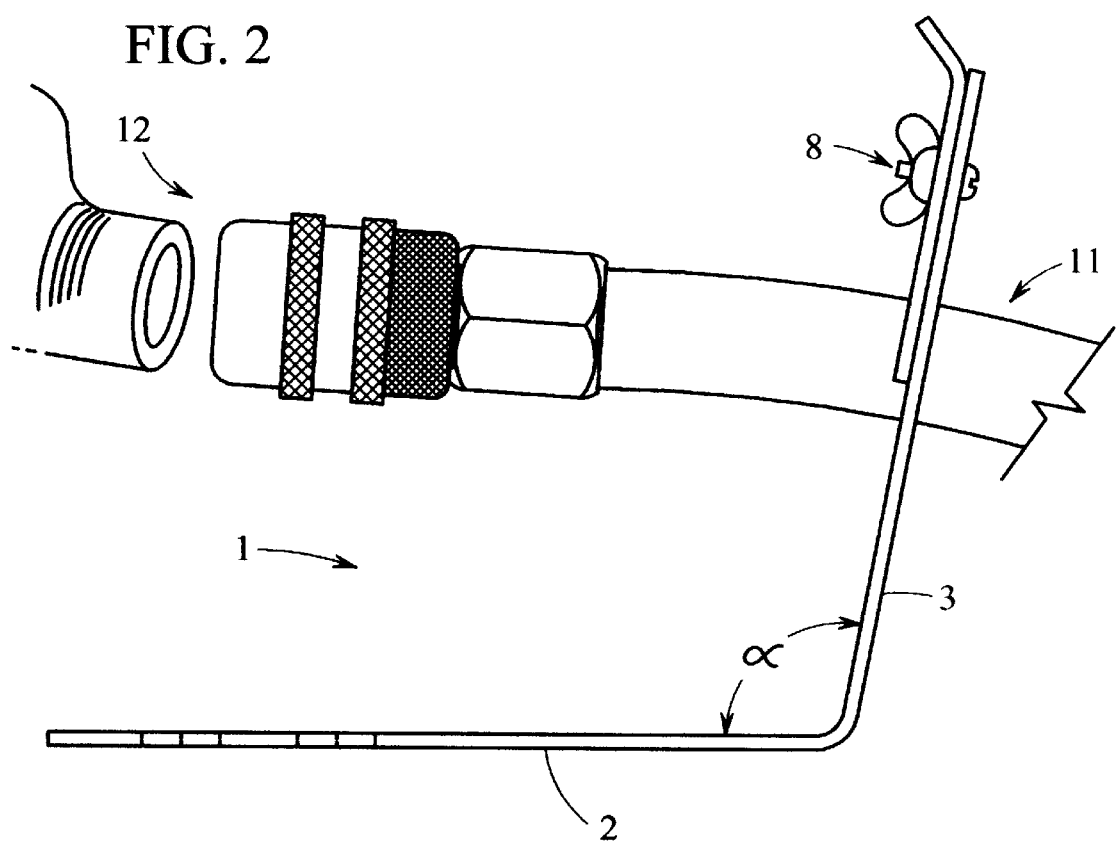

AIR HOSE HOLDER

BACKGROUND

1. Field of the Invention

This invention relates to a device used in the construction industry in connection with hoses through which air flows to operate machinery under pressure. The most common example is an air gun which is used to drive nails in for instance a roofing project. A contractor uses an air gun to apply shingles to a roof. The air hose is connected to the gun and under pressure from an air pressure generator located on the ground. The hose accumulates on the roof and must be moved by the contractors. Often the contractors must place the air gun on the roof and due to the force of gravity magnified by the weight and pressure within the hose it may slip off the roof. To assist in holding the hose on the roof and in preventing the air gun from sliding down the roof the inventor has designed an Air Hose Holder which consists of specific apparatus which may be temporarily installed on the roof with nails and which will adjust to hold any diameter hose.

An object of the invention is to assist contractors in working with hoses which are held under pressure for a particular purpose, for instance, to operate an air gun to drive nails into the surface of a roof.

A further object of the invention is to provide an inexpensive and easily manufactured device to increase the safety of contractors as they are using hoses on an uneven surface.

A further object of the invention is to provide a kit composed of the devise and an air gun and the hose to be used with the air gun and the device.

2. Brief Summary of the Invention

The invention consists of a bracket which is constructed of a horizontal base and a vertical support portion having various apertures through which an air hose will be secured such that an individual may use the support to direct and hold the hose in a determined position and to bear some of the weight of the hose so as to decrease the weight borne by the contractor in moving the hose from one location to another on an uneven surface such as a roof. The invention includes of an adjustable slip latch which defines the aperture through which the air hose is engaged and against which the air hose is secured.

BRIEF DESCRIPTION OF THE DRAWINGS

For a better understanding of the present invention, and to show how it may be carried into effect, reference will now be made, by way of example only, to the accompanying drawings in which:

FIG. 2 is a side view of the preferred embodiment of the air hose holding device.

PRIOR ART DISCLOSURE

The Applicant discloses the following patents which constitute prior art for his invention:
1. Farrar 1,809,550
2. Condon 5,370,345
3. Esch 2,034,510
4. Enckler 3,722,843
5. Druppel 1,812,518

Each discloses a device through which hose or pipe is engaged. None of the prior art teach a holder which is adjustable to accommodate different size hose. Also none teach a slip latch concept which can be tightened to bear some of the weight or pressure of the hose. Further the apparatus disclosed in its entirety is not found in the prior art.

DESCRIPTION OF THE PREFERRED EMBODIMENT

The invention will be described in relation to a preferred embodiment for use in holding air hoses, which are particularly useful when used in conjunction with nail guns, it being understood that the embodiment shown can be used to hold other objects. Thus although specific forms, materials, and dimensions of the parts are referred to, these are not limiting features.

Figure 1:
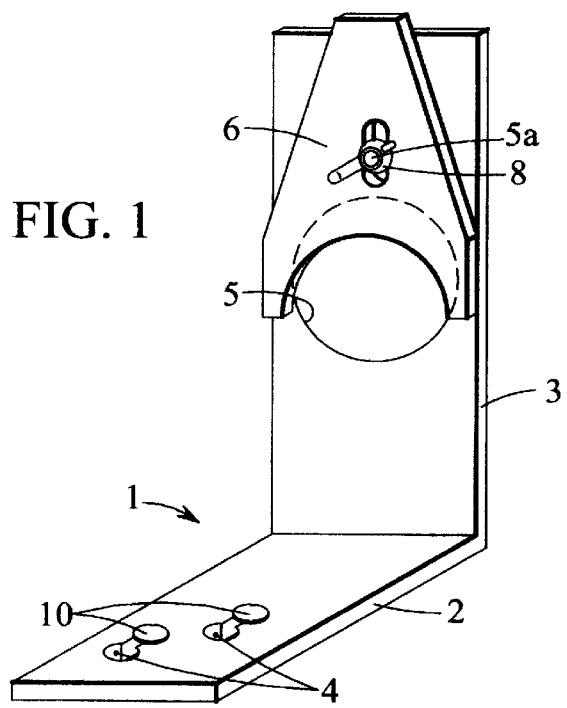
FIG. 1 is a perspective view of the preferred embodiment of the air hose holding device.
Figure 3:
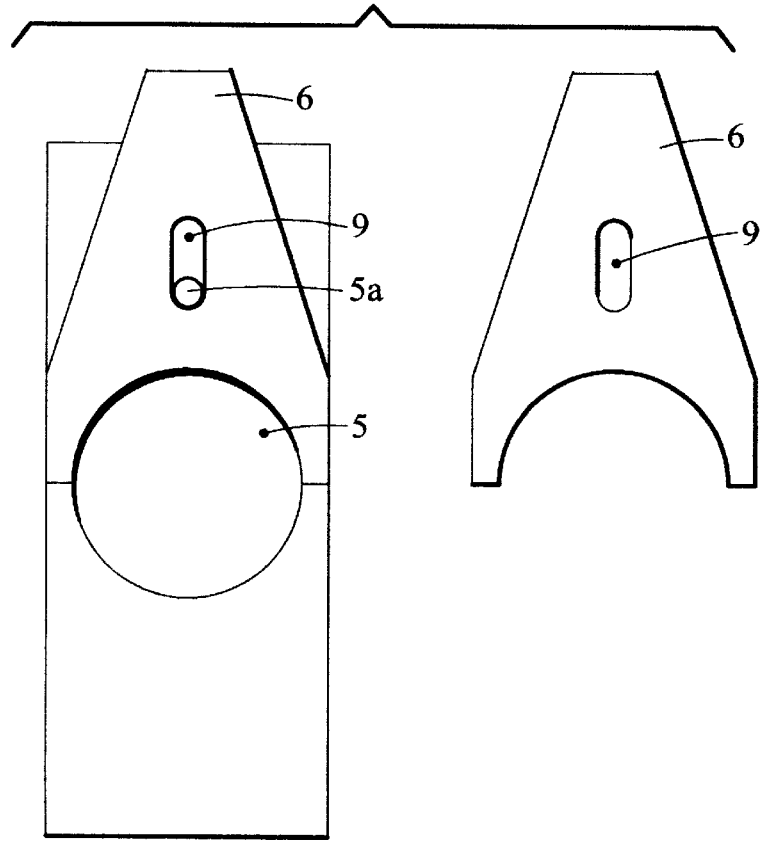
FIG. 3 is a rear elevation view of the preferred embodiment of the air hose holding device showing the slip latch separate from the support.

Referring now to FIGS. 1, 2 and 3 is the air hose holding device in accordance with the preferred embodiment of the invention. The device includes a bracket 1 having a base 2 and a support 3. The base 2 is planar and is preferably rectangular in shape, having a length l', width w', and a thickness t'. Preferably, the base 2 and support 3 thicknesses t, t' are substantially less than the widths w, w'. However, the thicknesses t, t' are sufficient to withstand bend and pull from usage with an air hose. The base 2 and support 3 widths w, w' may also than the lengths l, l'. As best shown in FIG. 2, one end of the length l' of the support 3 extends from one end of the length l of the base 2, forming an angle α between the base 2 and the support 3. The angle is preferably about 90°, such that the bracket 1 is L-shaped.

The base 2 and support 3 may be formed from a single piece of material, such that the base 2 thickness t and the support 3 thickness t' are uniform. The base 2 width w and the support 3 width w' may also be uniform.

When in use, the base 2 lies flat on a mounting surface, such as a roof top. The base 2 is situated such that its length is parallel to and lies along the mounting surface, and the support 3 extends upward from the mounting surface at the angle α.

As best shown in FIG. 1, the base 2 has a plurality of nail holes 4 bored through the entire thickness t. Fasteners, such as nails 10, fix the device to the mounting surface by passing through the holes 4 and piercing the mounting surface. Preferably these nail holes 4 are quick release nail holes, shown to have a circular portion and an oblong portion extending from the circular portion. When fixing the device to the mounting surface, the nails 10 pass through the elongated oval portion. The oblong portion is more narrow than the nail head, such that the nails 10 cannot pass completely through, but rather, the bracket 1 is held securely between the nail head and the mounting surface. The circular portion has a circumference large enough for a nail head to pass completely through. Thus, to quickly remove the bracket 1 from the mounting surface, the bracket 1 is moved parallel along the mounting surface, such that the nails 10 are moved from the oblong portion to the circular portion. The bracket 1 is then lifted upward, and the nail heads pass through the circular portion.

As best shown in FIG. 1, the support 3 has a lower aperture 5 through the entire thickness t'. This lower aperture 5 is located approximately in the center of the support 3, or in other words, in the center of the length l' and in the center of the width w'. The lower aperture 5 is preferably circular in shape, and has a circumference larger than the cross section of the object being held. In the case where the object being held is an air hose 11, the air hose 11 has a circumference less than the circumference of the lower aperture 5. To reduce friction between the air hose 11 and the edges of the lower aperture 5, the edges of the lower aperture are curved and polished to a smooth surface. Other additional friction reducing methods may equally be employed. The support 3 also has an upper aperture 5a which is located above the lower aperture 5 and which is located in the center of the support 3. Mounted through the upper aperture 5a is an adjustable slip latch 6. This slip latch 6 is preferably planar, and lies parallel along the support 3. This slip latch 6 is mounted above the lower aperture 5 through the upper aperture 5a. The portion of the slip latch 6 nearest the lower aperture 5 has a half-circle shape cut into it.

The slip latch 6 is held in place with a securing means preferably a lock nut, 8 and has an oval aperture 9 through which the lock nut passes. The slip latch is secured above the lower aperture 5.

As shown in FIG. 3, the slip latch 6 may be held in different locations, by tightening lock nut 8 at a different position within the oval aperture 9. Thus, the slip latch 6 may either be fixed closer to the lower aperture 5 or farther away from the lower aperture 5 to accommodate different sized hoses or other objects. As the slip latch 6 is fixed closer to the lower aperture 5, it covers a portion of the lower aperture 5. The half-circle of the slip latch 6 completes the circular shape of the lower aperture 5, and thus changes the size of the lower aperture 5. When an object is to be held in place within the lower aperture 5, the slip latch 6 is adjusted to snugly hold the object in place and to prevent slippage of the object in either direction through the lower aperture 5. The half-circle in the slip latch 6, like the lower aperture 5, may also include friction reducing methods, such as being curved and polished to a smooth surface.

Because the air hose holding device can be quickly and easily mounted and removed, many of the dangers present in securing hoses and other objects are eliminated. This is especially true where one works on a roof top. For example, an air hose 11 may be connected to a nail gun 12 used in roof construction. The device secures the air hose 11 in a desired position on a roof top. The holding device is easily mounted and secured with as few as two nails 10. The device need only be mounted once for an entire job, since the hose may be pulled through and held at different lengths within the aperture 5 of the device. Upon completion of the work, the nails 10 easily slip through the quick release nail holes 4 and the two nails 10 may simply be driven into the surface or removed. Also, because the air hose holding device is adaptable to various types and sizes of objects, an inventory of different sized holding devices is not required.

As best shown in FIG. 2, a kit is disclosed which contains the invention, an air hose and an air gun which sold together would comprise a preferred embodiment of the invention and maximixe the intended use.

While this invention has been described fully and completely with special emphasis upon certain preferred embodiments, it is to be understood that within the scope of the claims, this invention may be practiced otherwise than as specifically described.

What is claimed is:

1. An air hose holding device, particularly adapted to hold various types and sizes of hoses, comprising:
   a bracket;
   said bracket having a base;
   said bracket having a support extending from said base;
   a plurality of nail holes distributed in said base;
   said support having two apertures: a lower aperture and an upper aperture;
   said lower aperture being larger in diameter than the upper aperture and being rounded and polished to a smooth finish to reduce friction; and
   an adjustable slip latch having a longitudinal oval aperture and is centrally located within said slip latch mounted parallel and lies along said support, above said lower aperture and through said upper aperture with a lock nut which passes through said upper aperture of said support and through said longitudinal oval aperture of said slip latch, whereby the only function of said slip latch is to be moveably engaged over a hose.

2. The device of claim 1 wherein said support extends from said base at an angle $\alpha$.

3. The device of claim 2 wherein said base, said support and said slip latch are all planar.

4. The device of claim 2 wherein said base and said support are both rectangular in shape.

5. The device of claim 3 wherein said angle $\alpha$ is about 90°.

6. The device of claim 4 wherein said support has a center point and said lower aperture is located around said center point and said upper aperture is located above said lower aperture.

7. The device of claim 6 wherein a portion of said slip latch nearest said aperture has a half-circle shape cut into it.

8. An air hose holding device, particularly adapted to hold various types and sizes of hoses, comprising:
   a bracket;
   said bracket having a planar base, said base being rectangular in shape;
   said bracket having a planar support, said support being rectangular in shape and extending at an angle $\alpha$ from said base;
   a plurality of nail holes distributed in said base;
   said support having an upper and a lower aperture;
   said lower aperture is rounded and polished to a smooth finish to reduce friction caused by the air hose being pulled though said lower aperture;
   a planar adjustable slip latch mounted parallel to and along said support through said upper aperture;
   said slip latch having a longitudinal oval aperture centrally located within said slip latch;
   said slip latch being held in place with a lock nut that passes through said slip latch and through said upper aperture;
   said slip latch having a half-circle shape cut into it at its end nearest said lower aperture; such that said half-circle shape changes said aperture size by completing said aperture's circular shape; and
   said half-circle shape is rounded and polished to a smooth finish to reduce friction caused by the air hose being pulled through said slip latch.

9. A kit for holding air hoses, particularly adapted to hold various types and sizes of hoses securely on a mounting surface, comprising:
   a bracket;
   said bracket having base;
   said bracket having a support extending at an angle $\alpha$ from said base;
   a plurality of nail holes distributed in said base;

a plurality of nails, which when inserted in said nail holes, secure said base to said mounting surface;

said support having an upper and a lower aperture;

said lower aperture having a circular shape and a circumference;

said lower aperture having friction reducing means about said circumference;

an air hose having a tubular shape and a cross-sectional circumference less than said lower aperture circumference;

said air hose, having a proximal end, which when inserted in said lower aperture, said air hose may move freely through said lower aperture;

an adjustable slip latch, which when movably mounted through said upper aperture on said support may adjust said lower aperture size and may hold said air hose in said lower aperture at a fixed position; and a nail gun for connection with said proximal end of said air hose after said air hose is inserted in said lower aperture.

10. The kit of claim 9 wherein said base and said support are both planar.

11. The kit of claim 10 wherein said base and said support are both rectangular in shape.

12. The kit of claim 11 wherein said support has a center point and said lower aperture is located around said center point.

13. The kit of claim 12 wherein said slip latch is planar, and is mounted parallel to and lies along said support.

14. The kit of claim 13 wherein said slip latch has a longitudinal oval aperture and is mounted by a lock nut engaged through said upper aperture in said support.

15. The kit of claim 14 wherein said slip latch is held in place with a lock nut that passes through said longitudinal oval aperture in said slip latch and through said upper aperture in said support.

16. The kit of claim 15 wherein a portion of said slip latch nearest said lower aperture has a half-circle shape cut into it, such that said half-circle shape changes said lower aperture size by completing said lower aperture's circular shape, and said half-circle shape is rounded and polished to a smooth finish to reduce friction caused by the air hose being pulled through said slip latch.

17. The kit of claim 10 wherein said angle α is about 90°.

* * * * *